(12) United States Patent
Takahashi et al.

(10) Patent No.: US 9,574,667 B2
(45) Date of Patent: Feb. 21, 2017

(54) MECHANICAL SEAL DEVICE

(71) Applicants: EAGLE BURGMANN JAPAN CO., LTD., Tokyo (JP); EAGLE INDUSTRY CO., LTD., Tokyo (JP)

(72) Inventors: Hidekazu Takahashi, Tokyo (JP); Ryoji Muraki, Tokyo (JP)

(73) Assignees: EAGLE BURGMANN JAPAN CO., LTD., Tokyo (JP); EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/432,396

(22) PCT Filed: Mar. 13, 2014

(86) PCT No.: PCT/JP2014/056763
§ 371 (c)(1),
(2) Date: Mar. 30, 2015

(87) PCT Pub. No.: WO2014/142265
PCT Pub. Date: Sep. 18, 2014

(65) Prior Publication Data
US 2016/0003361 A1      Jan. 7, 2016

(30) Foreign Application Priority Data
Mar. 14, 2013 (JP) .................................. 2013-052091

(51) Int. Cl.
*F16J 15/34* (2006.01)
*F16J 15/36* (2006.01)

(52) U.S. Cl.
CPC .............. *F16J 15/36* (2013.01); *F16J 15/342* (2013.01); *F16J 15/3408* (2013.01);
(Continued)

(58) Field of Classification Search
CPC ........ F16J 15/34; F16J 15/3404; F16J 15/342; F16J 15/36; F16J 15/363; F16J 15/3408; F16J 15/3416; F16J 15/3436; F16J 15/3448; F16J 15/3452
See application file for complete search history.

(56) References Cited

U.S. PATENT DOCUMENTS 4,335,888 A * 6/1982 Ohba .................... F16J 15/3496
                                                               277/306
4,688,806 A * 8/1987 Heilala .................. F16J 15/363
                                                               277/389

(Continued)

FOREIGN PATENT DOCUMENTS

DE    3612327 A1    8/1987
FR    1252558 A     1/1961
(Continued)

OTHER PUBLICATIONS

International Preliminary Search on Patentability and Written Opinion mailed Sep. 24, 2015 for corresponding JP Application No. PCT/JP2014/056763.

(Continued)

*Primary Examiner* — Nicholas L Foster
(74) *Attorney, Agent, or Firm* — Harness, Dickey & Pierce, P.L.C.

(57) ABSTRACT

A mechanical seal device 1 comprises a seal case 30 attached to the device main body, a rotary seal ring 60 attached to the rotary shaft 100, a stationary seal ring 50 arranged in an axial direction opposing to the rotary seal ring 60, and a bellows 40 attached extendably in the axial direction between the stationary seal ring 50 and the seal case 30. A static pressure fluid supplying hole 56, supplying a static pressure fluid to a static pressure fluid chamber C arranged at an inner circumferential side of the bellows, is formed on the seal case 30. A communication hole, guiding the static pressure fluid of the static pressure fluid chamber C to sealing surfaces between the stationary seal ring 50 and the rotary (Continued)

seal ring 60 is formed on the stationary seal ring 50. The sealed fluid is arranged at an outer circumferential side of the bellows 40.

11 Claims, 5 Drawing Sheets

(52) U.S. Cl.
CPC ....... *F16J 15/3436* (2013.01); *F16J 15/3448* (2013.01); *F16J 15/363* (2013.01); *F16J 15/3416* (2013.01)

(56) References Cited

U.S. PATENT DOCUMENTS

| | | | | |
|---|---|---|---|---|
| 4,973,065 | A * | 11/1990 | Habich | F16J 15/3468 |
| | | | | 277/399 |
| 8,231,130 | B2 * | 7/2012 | Takahashi | F16J 15/3404 |
| | | | | 277/375 |
| 8,800,995 | B2 * | 8/2014 | Suefuji | F16J 15/36 |
| | | | | 277/401 |
| 2009/0085300 | A1 * | 4/2009 | Takahashi | F16J 15/3404 |
| | | | | 277/391 |
| 2012/0139186 | A1 * | 6/2012 | Suefuji | F16J 15/36 |
| | | | | 277/377 |
| 2015/0159759 | A1 * | 6/2015 | Suefuji | F16J 15/3464 |
| | | | | 277/369 |
| 2015/0240950 | A1 * | 8/2015 | Takahashi | F16J 15/3412 |
| | | | | 277/377 |

FOREIGN PATENT DOCUMENTS

| | | |
|---|---|---|
| FR | 1276470 A | 11/1961 |
| GB | 1309865 A | 3/1973 |
| JP | 36-3606 B1 | 5/1961 |
| JP | S44-8930 B1 | 4/1969 |
| JP | 179336 | 6/1984 |
| JP | 37-11308 B2 | 11/2005 |
| WO | 2006/051702 A1 | 5/2006 |

OTHER PUBLICATIONS

Corresponding CN Office Action dated Nov. 18, 2015.
Extended European Search Report (EESR) mailed Apr. 26, 2016 in corresponding EP Application No. 14764286.2-1751.

* cited by examiner

MECHANICAL SEAL DEVICE

CROSS-REFERENCE TO RELATED APPLICATIONS

This application is a 371 U.S. National Stage of International Application No. PCT/JP2014/056763, filed Mar. 13, 2014, which claims priority to Japanese Patent Application No. 2013-052091, filed Mar. 14, 2013. The entire disclosures of the above applications are incorporated herein by reference.

TECHNICAL FIELD

The present invention relates to a mechanical seal device.

BACKGROUND ART

Conventionally, as a mechanical seal device, a static pressure mechanical seal device preventing a fluid sealed inside a machine from leaking toward the outside of the machine is known. For such static pressure mechanical seal device, by supplying higher purge gas on a seal surface compared to the sealed fluid, the purge gas is leaked toward the inside and the outside of the machine, with the result that the seal fluid is prevented from leaking toward the outside of the machine.

However, in a conventional static pressure mechanical seal device, due to a pressure fluctuation inside of the machine, a balance between the pressure inside of the machine and the pressure of the purge gas is broken, with the result that it tended to be difficult to properly maintain a clearance between sliding surfaces. For example, as the pressure inside of the machine is higher than the predetermined pressure, the clearance between the sliding surfaces is opened more than necessary, with the result that the sealed fluid might be leaked toward the outside of the machine. Further, as the pressure inside of the machine is lower than the predetermined pressure, it causes contacts of sliding surfaces, with the result that the sliding surfaces tended to be damaged.

In order to solve the above problems, for example, a mechanical seal device as illustrated in Patent Document 1 is suggested. In the mechanical seal device of Patent Document 1, a back-pressure introduction passage communicating between a region inside of the machine and a back region of a stationary seal ring is formed. However, for the conventional mechanical seal device of Patent Document 1 and the like, a plurality of O-rings needs to be arranged between the stationary seal ring and a seal case and that resulted in a decrease in an axial synchronized movability rate (synchronized movability deteriorates) of the stationary seal ring.

Further, in the conventional mechanical seal device of Patent Document 1 and the like, cloggings occur in the back-pressure introduction passage formed narrow and long, so that there was a problem that the pressure of the sealed fluid could not be applied on the back face of the stationary seal ring. Further, components included in the sealed fluid stick to the operational O-rings, springs and the like arranged in the back region of the stationary seal ring, with the result that the axial synchronized movability of the stationary seal ring deteriorate.

Patent Document 1: WO99-27281

SUMMARY OF THE INVENTION

Technical Problems to be Solved by the Invention

It is therefore an object of the present invention to provide a mechanical seal device capable of preferably sealing a sealed fluid.

Means for Solving the Technical Problems

In order to achieve the above object, a mechanical seal device according to the present invention is a mechanical seal device for sealing a sealed fluid inside of a machine at a space formed between a device main body and a rotary shaft, and comprises:
  a seal case attached to the device main body,
  a rotary seal ring attached to the rotary shaft,
  a stationary seal ring arranged in an axial direction opposing to the rotary seal ring, and
  a bellows attached extendably in the axial direction between the stationary seal ring and the seal case, wherein
  a static pressure fluid supplying hole, supplying a static pressure fluid to a static pressure fluid chamber arranged at an inner circumferential side of the bellows, is formed on the seal case,
  a communication hole, guiding the static pressure fluid of the static pressure fluid chamber to sealing surfaces between the stationary seal ring and the rotary seal ring, is formed on the stationary seal ring, and
  the sealed fluid is arranged at an outer circumferential side of the bellows.

According to the mechanical seal device having the above configuration, the pressure of the sealed fluid is applied to the outer circumference of the bellows. Therefore, even when the sealed fluid including solid components is sealed, it enables to exhibit preferable sealing performance.

Further, for the mechanical seal device of the present invention, the pressure of the sealed fluid is applied to the outer circumference of the bellows, and the bellows is able to exhibit its sealing performance and also to apply a compressive force. Therefore, the structure of O-rings, springs and the like contacting with the sealed fluid can be reduced. Further, in the present invention, by smoothly moving the stationary seal ring in the axial direction, it enables to exhibit preferable sealing performance. Further, the bellows is extendable in the axial direction and also deformable in a radial direction, with the result that it enables the stationary seal ring attached to the bellows to absorb vibrations and further enables to exhibit preferable sealing performance.

Further, for the mechanical seal device of the present invention, the sealed fluid is arranged at the outer circumference of the bellows, therefore design flexibility at the inner circumferential side of the bellows is significantly improved. Specifically, even when the sealed fluid including corrosive fluid and solid components is sealed, the sealed fluid does not contact with the inner circumference of the bellows. Therefore, materials of members arranged at the inner circumference of the bellows can be freely selected.

Preferably, the mechanical seal device further comprises a seal member, arranged between the seal case and the stationary seal ring at the inner circumferential side of the bellows, holding the stationary seal ring movably in the axial direction and sealing the static pressure fluid chamber from an atmosphere side space.

In the mechanical seal device having the above structure, the seal member is arranged at the inner circumference of the bellows and therefore the sealed fluid does not contact with the seal member. With this, choices of materials for the seal member increase and further risks of deterioration of the seal member due to the contact with the sealed fluid are eliminated.

Further, preferably, annular grooves connecting to the communication hole are formed on the stationary seal ring. The annular grooves connecting to the communication hole guides the static pressure fluid to a whole area of the sealing surfaces between the stationary seal ring and the rotary seal ring, with the result that it enables to preferably apply the static pressure over the seal surfaces.

Preferably, an outer diameter of the annular grooves is designed so that it is nearly equal to a pressure acting diameter of the bellows. With the annular grooves having the above structure, it enables to control the compressive force acting on the stationary seal ring only by adjusting the widths of the annular grooves.

Preferably, the mechanical seal device further comprises a resilient member, arranged closer to the atmosphere side than the seal member and pressing the stationary seal ring toward the rotary seal ring. By arranging the resilient member at the atmosphere side with respect to the seal member, the resilient member does not contact with the sealed fluid and the static pressure fluid. As a result, choices of materials for the resilient member increase and further risks of deterioration of the resilient member, which is due to the contacts with the sealed fluid and the static pressure fluid, are eliminated.

Further, preferably, an inner diameter of the annular grooves is designed so that it is nearly equal to a contact diameter where the seal member contacts the stationary seal ring. With the annular grooves formed as above, it enables to control the compressive force acting on the stationary seal ring only by adjusting the widths of the annular grooves.

The resilient member pressing the stationary seal ring toward the rotary seal ring may be arranged inside the static pressure fluid chamber. By arranging the resilient member inside the static fluid chamber, the pressure of the static pressure fluid in the static pressure fluid chamber acts on a back face of the stationary seal ring which is pressed by the resilient member. Therefore, it enables to increase a pressing force of the stationary seal ring, by the static pressure fluid, toward the rotary seal ring. The above structure is particularly effective, in order to meet a request for an increase of the pressing force of the stationary seal ring toward the rotary seal ring.

Further preferably, dynamic pressure generating grooves are formed on the sealing surface of the rotary seal ring. The dynamic pressure generating grooves generate the dynamic pressure when the rotary seal ring rotates and guide the static pressure fluid over the seal surface, with the result that it enables to preferably apply the static pressure over the seal surface.

DESCRIPTION OF THE PREFERRED EMBODIMENTS

First Embodiment

A mechanical seal device 1 according to the present embodiment is a seal device mounted on apparatuses such as stirring machines for general industrial use, blowers, compressors and the like. Particularly, it is used for purposes of manufacturing food products, medical products and chemical substances.

The mechanical seal device 1 has an inside type structure, in which the sealed fluid is arranged outside in a radial direction with respect to a sealing surface. The sealed fluid at a machine inside B is sealed by the seal device 1 arranged at a clearance formed between a rotary shaft 100 and a stuffing box 80. Further, in FIGS. 1 and 2, the left side in the axial direction is a machine outside A and the right side in the axial direction is the machine inside B.

A shaft hole 82 is formed through the stuffing box 80, and the rotary shaft 100 rotatably supported by bearings which is not expressed with a figure, extends through this shaft hole 82. At the inner side of the shaft hole 82 in the radial direction, the rotary seal ring 60 is arranged. The rotary seal ring 60 is fixed to the rotary shaft 100 while it is positioned by a spacer 75 in the axial direction. The spacer 75 is arranged between a radial direction stepped portion 102 of the rotary shaft 100 and the rotary seal ring 60, and the rotary seal ring 60 is positioned in the axial direction. The spacer 75 is composed of materials having excellent strength, such as SUS, engineering plastics and the like.

A flinger 70 and a sleeve 76 are arranged in the axial direction at the machine inside B of the rotary seal ring 60. The sleeve 76 fixes the rotary seal ring 60 in the axial direction using the flinger 70.

The flinger 70 is arranged between the sleeve 76 and the rotary seal ring 60 to prevent the solid components in the sealed fluid from entering into between the shaft hole 82 of the stuffing box 80 and the outer circumference surface of the rotary seal ring 60 from the machine inside B. Specifically, at the outer circumference of the flinger 70, a cylindrical portion 71 extending in the axial direction toward the machine outside A is formed. The cylindrical portion 71 covers a protruding portion 86 protruding from the stuffing box 80 in the axial direction toward the machine inside B. Further, the flinger 70 guides the sealed fluid and solid components included therein outwardly in the radial direction by a centrifugal force caused by the rotation together with the rotary shaft 100. Therefore, it enables to prevent the solid components in the sealed fluid from entering into between the shaft hole 82 of the stuffing box 80 and the outer circumference surface of the rotary seal ring 60.

The inner circumferential surface of the flinger 70 toward the rotary seal ring 60 is formed into a tapered shape, and an O-ring 128 is arranged thereon. The O-ring 128 prevents the sealed fluid from leaking from between the rotary seal ring 60 and the rotary shaft 100.

Figure 3:
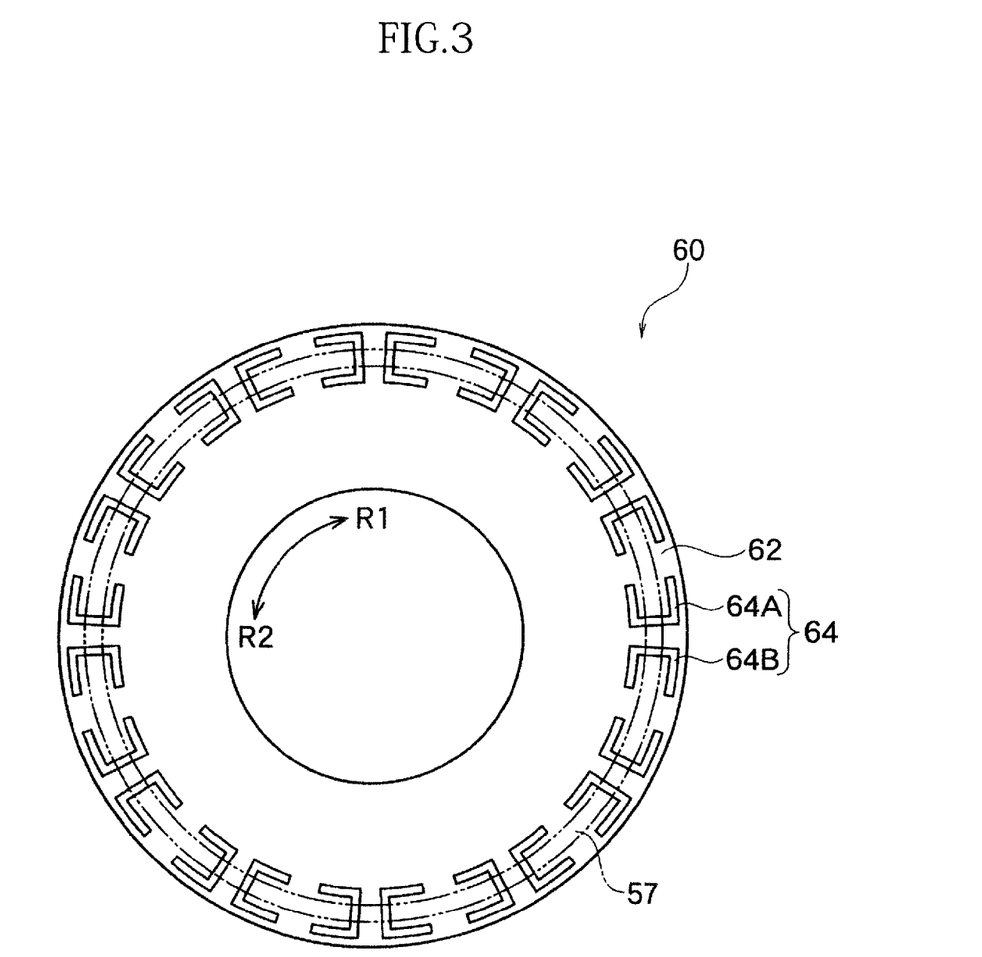
FIG. 3 is a front view of a rotary seal ring illustrated in FIGS. 1 and 2.

The rotary seal ring 60 has a sealing surface 62, toward the machine outside A, opposing to a sealing surface 55 of the stationary seal ring 50. As illustrated in FIG. 3, on the sealing surface 62, a dynamic pressure generating grooves 64 are formed. The dynamic pressure generating groove 64 comprises a first groove 64A for a forward rotation R1 and a second groove 64B for a reverse rotation R2. The first groove 64A and the second groove 64B are symmetrically arranged in the radial direction, and a plurality of pairs of the first groove 64A and the second groove 64B are formed in a circumferential direction at equal intervals. The dynamic pressure generating groove 64 generates the dynamic pressure by the rotation of the rotary seal ring 60 together with the rotary shaft 100.

Figure 1:
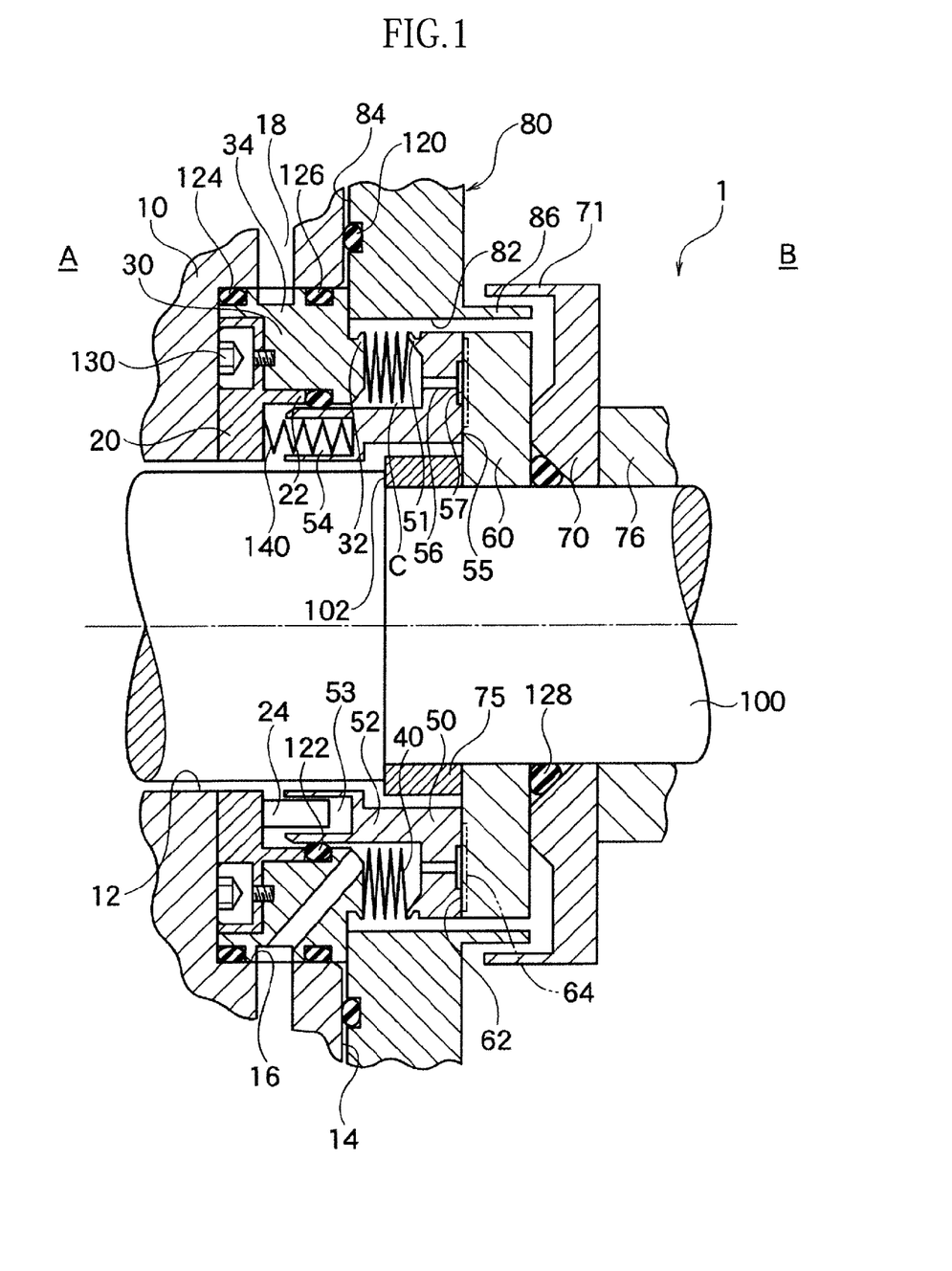
FIG. 1 is a cross section of a mechanical seal device according to one embodiment of the present invention.

As illustrated in FIG. 1, a seal housing 10, an adapter 20, a seal case 30, a bellows 40, a stationary seal ring 50 and the like are arranged in the axial direction at the machine outside A of the rotary seal ring 60. The seal housing 10 is attached to the staffing box 80. Specifically, by passing bolts (not expressed with a figure) embedded at the outer surface 84 of the staffing box 80 through grooves for attaching a seal housing 10 (not expressed with a figure) and then fastening by nuts (not expressed with a figure), the seal housing 10 is attached on the staffing box 80. Between the seal housing 10 and the staffing box 80, the O-ring 120 is arranged in order to prevent the sealed fluid from leaking from between the seal housing 10 and the staffing box 80.

At the inner circumferential surface 12 of the seal housing 10, a mounting groove 16 is formed at the side of the end surface 14 toward the machine inside B in the axial direction and the adapter 20 and the seal case 30 are attached thereon. The adapter 20 and the seal case 30 are placed in the mounting groove 16, with the result that it enables to downsize the mechanical seal device 1 in the axial direction and in the radial direction.

The adapter 20 attached to the seal housing 10 has a protruding portion 22 extending in the axial direction toward the machine inside B and it is mounted on the seal case 30 at the outer side in the radial direction than the protruding portion 22. The adapter 20 and the seal case 30 are fixed by a fastening member 130. A space between the tip of the protruding portion 22 and a stepped portion at the inner circumferential surface of the seal case 30 serves as a receiving part that receives an O-ring 122 (seal member). Further, the adapter 20 and the seal case 30 may be integrally formed. The adapter 20 is defined as a part of the seal case 30 in the present embodiment, even if they are two different parts.

At a stepped outer diameter end portion 32 of the seal case 30 in the axial direction toward the machine inside B, one end of the bellows 40 is attached. The other end of the bellows 40 is attached to an outer diameter end portion 51 of the stationary seal ring 50. The bellows 40 is arranged at the inner side of the shaft hole 82 of the staffing box 80, and the sealed fluid is arranged at the outer circumferential side of the bellows 40. The bellows 40 is extendable in the axial direction and also deformable in the radial direction. Therefore, the stationary seal ring 50 attached to the bellows 40 can absorb vibrations of the device, with the result that the mechanical seal device 1 can exhibit preferable sealing performance. Further, the bellows 40 is used as seal elements. Therefore, compared with the case using the O-ring and the like, it enables to downsize the mechanical seal device 1 in the axial direction and in the radial direction.

The cylindrical portion 52 is formed on the inner circumferential side of the stationary seal ring 50 to extend in the axial direction toward the machine outside A in the inner circumferential side of the bellows 40. Between the outer circumferential surface of the cylindrical portion 52 and the inner circumferential stepped portion of the seal case 30, the O-ring 122 is arranged. Further, the static pressure fluid chamber C is formed to be surrounded by the O-ring 122, the seal case 30, the bellows 40, and the stationary seal ring 50.

The O-ring 122 seals the static pressure fluid chamber C from the atmosphere side space corresponding to the machine outside A.

In the static pressure fluid chamber C, the purge gas as the static pressure fluid (for example, such as nitrogen gas) is supplied from the static pressure fluid supplying hole 34. The static pressure fluid supplied from the static pressure fluid supplying hole 34 can be appropriately selected according to the use purpose of the mechanical seal device 1. For example, the static pressure fluid may be liquids such as water.

The O-ring 122 seals between the outer circumferential surface of the cylindrical portion 52 of the stationary seal ring 50 and the seal case 30, and further holds the stationary seal ring 50 movably in the axial direction. When the stationary seal ring 50 moves in the axial direction, sliding resistance of one O-ring 122 only acts. Therefore, it enables to smoothly move the stationary seal ring 50 in the axial direction.

Further, the O-ring 122 is arranged at the inner circumferential surface side of the bellows 40 and it is isolated from the sealed fluid. With this, regardless of the fluid to be sealed, materials of the O-ring 122 can be selected. Further, risks of deterioration due to the contacts of the O-ring 122 with the sealed fluid are eliminated. As a result, in the present invention, it enables to exhibit a preferable sealing performance by smoothly moving the stationary seal ring 50 in the axial direction.

At the atmosphere side of the cylindrical portion 52 rather than to the O-ring 122, a guide groove 53 and a spring seat 54 are formed. A fixing pin 24 embedded in the adapter 20 is inserted in the guide groove 53, and the fixing pin 24 and the guide groove 53 are relatively movable in the axial direction and are engaged in the circumferential direction. With this, the stationary seal ring 50 is arranged so that it is movable in the axial direction and is unrotatable in the circumferential direction (in a rotation direction of a rotating shaft 100), with respect to the seal cover 30.

A plurality of spring seats 54 are provided in the circumferential direction to hold a plurality of coil springs 140 between the spring seats and opposing surfaces of the adapter 20. The coil springs 140 applies the compressive force pressing the stationary seal ring 50 toward the rotary seal ring 60.

In the present embodiment, the fixing pins 24 and the coil springs 140 are arranged at the atmosphere side rather than the O-ring 122. At the atmosphere side rather than the O-ring 122, the fixing pins 24 and the coil springs 140 do not contact with the sealed fluid and the static pressure fluid, with the result that choices of materials of the above members increase and further risks of deterioration of these members are eliminated. As a result, the stationary seal ring 50 is smoothly moved in the axial direction and thereby enables to exhibit a preferable sealing performance. Further, the structure of the above O-ring 122 and the coil spring 140 can be replaced with the bellows.

On the seal case 30, the static pressure fluid supplying hole 34 is formed. The static pressure fluid supplying hole 34 communicates from an outer circumferential end surface of the seal case 30 to the static pressure fluid chamber C in the inner circumferential side of the bellows 40. At the outer circumferential end surface of the seal case 30, the O-rings 124, 126 are arranged on both sides of the static pressure fluid supplying hole 34 to seal between the seal case 30 and the seal cover 10. At the outside of the seal cover 10, a purge gas supply device (which is not expressed with a figure) is connected. Further, the purge gas supplied from the purge gas supply device is delivered to the static pressure fluid chamber C through a gas flow passage 18 of the seal cover 10 and the static pressure fluid supplying hole 34 of the seal case 30.

Figure 4:
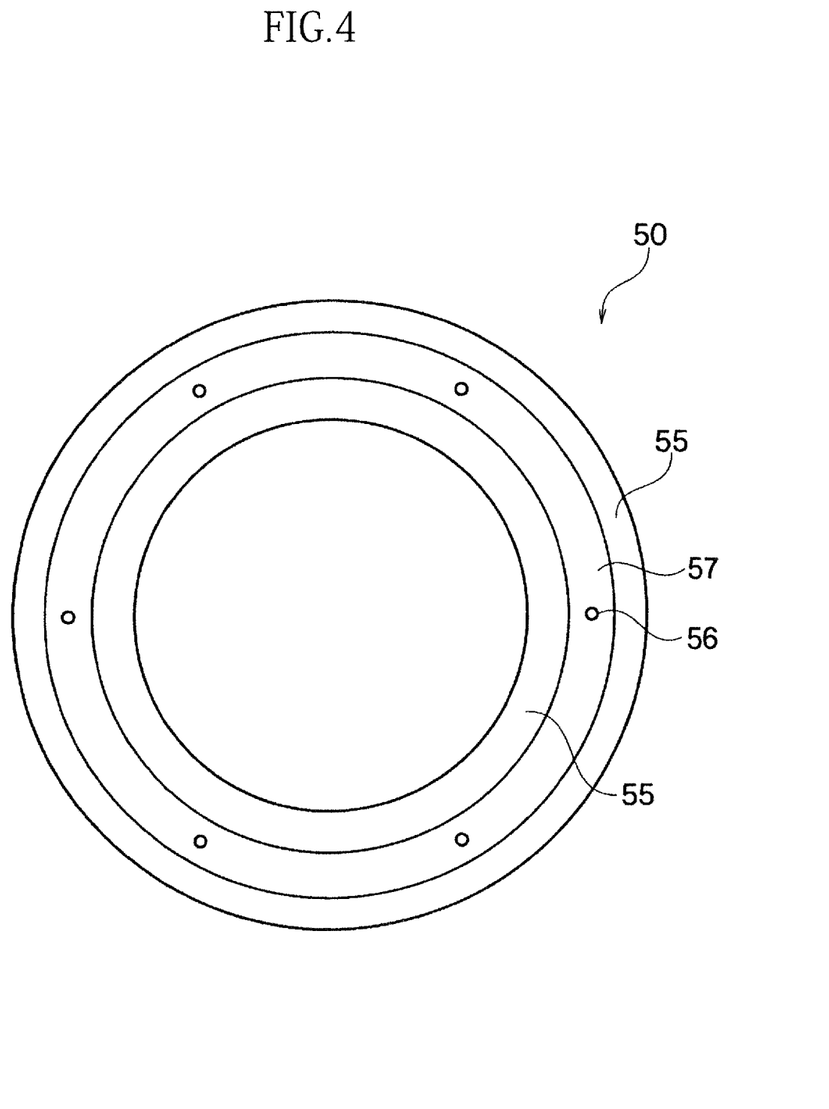
FIG. 4 is a front view of a stationary seal ring illustrated in FIGS. 1 and 2.

On the stationary seal ring 50, communication holes 56 extending from the static pressure fluid chamber C toward the machine inside B are formed in the axial direction. The purge gas guided by the static pressure fluid chamber C passes through the communication holes 56 of the stationary seal ring 50 to be guided toward the seal surface 55. As illustrated in FIG. 4, annular grooves 57 continuing to the communication holes 56 are formed on the seal surface 55 of the stationary seal ring 50, and the purge gas guided by the static pressure fluid chamber C passes through the communication holes 56 of the stationary seal ring 50 to be guided by the annular groove 57 at the side of the seal surface 55. Further, a plurality of communication holes 56 are formed along the circumferential direction of the annular grooves 57. The annular grooves 57 continuing to the communication holes 56 guide the static pressure fluid over the relative sliding surfaces between the stationary seal ring 50 and the rotary seal ring 60, with the result that it enables to preferably apply the static pressure on the relative sliding surfaces. Further, on the seal surface 62 of the rotary seal ring 60 opposing to the seal surface 55 of the stationary seal ring 50, the dynamic pressure generating grooves 64 are formed. With the dynamic pressure generating grooves 64, the static pressure generates over the relative sliding surfaces.

The purge gas is supplied with a pressure higher than the sealed fluid, and the purge gas guided in the annular grooves 57 generates the static pressure so that the relative sliding surfaces between the seal surface 55 and the seal surface 62 are prevented from contacting to each other. Further, the purge gas guided in the relative sliding surfaces may be leaked toward the machine inside B and/or the machine outside A. The purge gas leaking toward the machine inside B is discharged from the outer circumferential side of the flinger 70, with the result that it prevents the sealed fluid from entering into the shaft hole 82 of the staffing box 80 from the machine inside B. With this, the risks that solid components in the sealed fluid stick to the relative sliding surfaces between the seal surface 55 and the seal surface 62 and to the outer circumference of the bellows 40 are eliminated and thereby enables to exhibit preferable sealing performance.

Further, in the present embodiment, the stationary seal ring 50 and the rotary seal ring 60 are composed of materials such as silicon carbide (SiC), carbon, hard metal alloy and the like. Further, examples of materials of the O-rings 120 to 128 include fluororubber, nitrile rubber, EPDM, perfluoroelastomer and the like.

Figure 2:
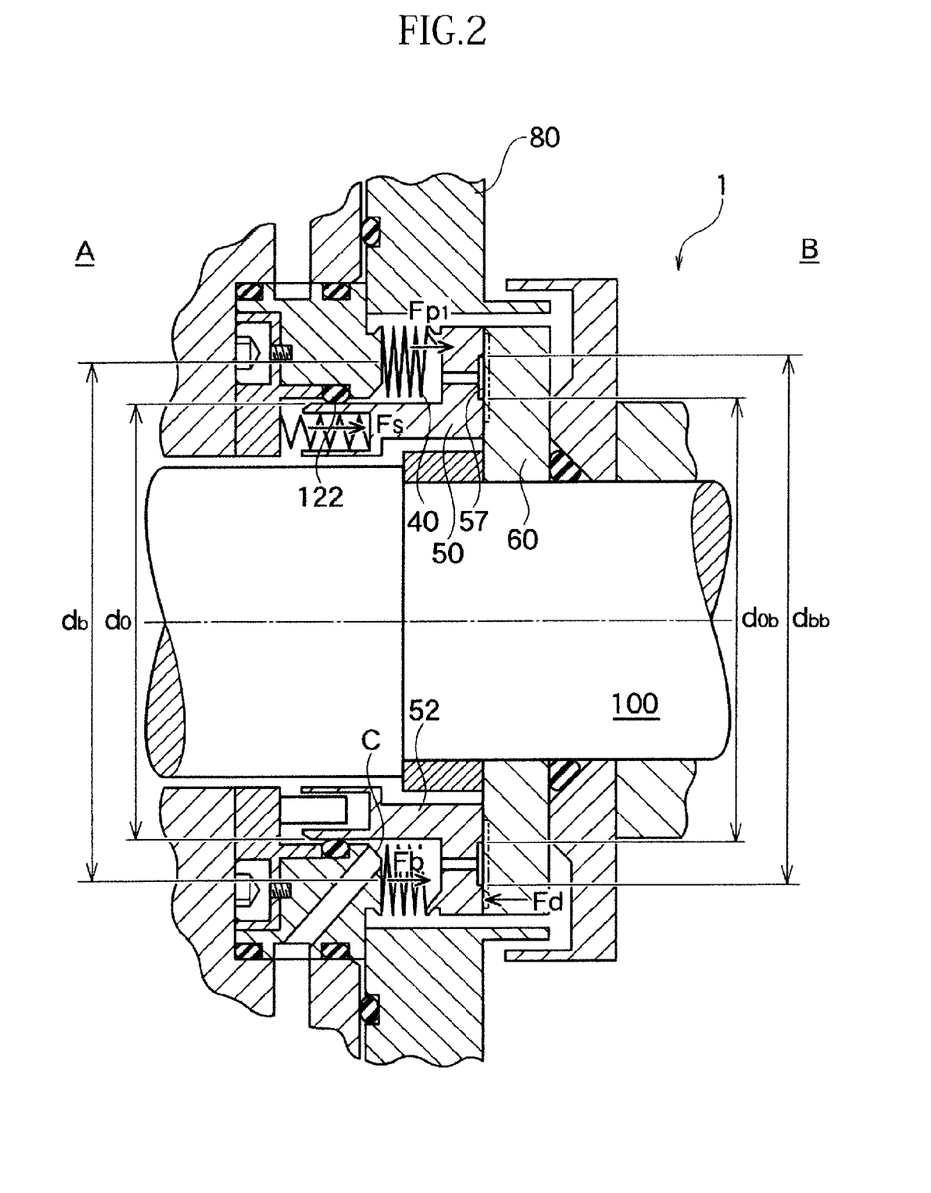
FIG. 2 is a view explaining a main part of the cross section illustrated in FIG. 1.

As illustrated in FIG. 2, for the mechanical seal device 1 of the present embodiment, an inner diameter "dob" of the annular groove 57 of the stationary seal ring 50 is substantially equal to a contact diameter "do" (balance diameter) where the O-ring 122 contacts on the cylindrical portion 52. Further, an outer diameter "dbb" of the annular groove 57 of the stationary seal ring 50 is substantially equal to the pressure acting diameter "db" (average diameter of outer circumferential diameter and inner circumferential diameter of the bellows) of the bellows 40. With the above inner diameter "dob" and the outer diameter "dbb" of the annular groove 57, it enables to freely adjust the compressive force acting on the stationary seal ring 50 as explained below.

For example, the inner diameter "dob" and the outer diameter "dbb" of the annular groove 57 are formed so as to satisfy the following relation.

(Inner diameter of the annular groove 57)"dob"="do"(Contact diameter where the O-ring 122 contacts on the cylindrical portion 52)

(Outer diameter of the annular groove 57)"dbb"="db"(Pressure acting diameter of the bellows 40)

In this case, it is only necessary to satisfy the relation among a dynamic pressure Fd generated by the rotation of the rotary seal ring 60, a pressing force Fp1 generated by the sealed fluid pressure P1 acting from the outer circumferential side of the bellows 40, a resilient energization force Fs of the spring and the resilient energization force Fb of the bellows as indicated in the following formula 1, as long as the relation "gas purge pressure P2>sealed fluid pressure P1" is maintained. With this, it enables to simplify the design of the mechanical seal device 1.

$$Ftc=Fp1+Fs+Fb<Fd \quad \text{(formula 1)}$$

For example, in order to increase the compressive force of the stationary seal ring 50 toward the rotary seal ring 60, it is only necessary to make a width (span) of the inner/outer diameter of the annular groove 57 smaller than the case of "dob=do, dbb=db" while maintaining the relation of "Ftc<Fd".

Further, in order to reduce the compressing force toward the rotary seal ring 60 of the stationary seal ring 50, it is only necessary to make a width of the inner/outer diameter of the annular groove 57 larger than the case "dob=do, dbb=db" while maintaining the relation of "Ftc<Fd".

For the mechanical seal device 1 having the above structure, the bellows 40 exhibits sealing performance and also applies the compressive force to the stationary seal ring 50. With this, for the mechanical seal device 1 of the present embodiment, it enables to substantially reduce the structure such as O-rings and springs. Further, the sliding resistance caused when the stationary seal ring 50 moves in the axial direction is substantially reduced, with the result that it enables preferably to exhibit sealing performance by smoothly moving the stationary seal ring 50 in the axial direction. Further, the mechanical seal device 1 has a simple structure, and it is downsized in the axial direction and in the radial direction.

Further, members such as O-ring 122 and coil spring 140 arranged at the inner circumference of the bellows 40 do not contact with the sealed fluid. Therefore, even when the fluid including corrosive fluid and solid components is sealed, such members are not deteriorated, with the result that it enables preferably to exhibit sealing performance. Further, it is configured so that the solid components of the sealed fluid do not infiltrate to the outer circumference of the bellows 40, with the result that the solid components of the sealed fluid do not adhere to the bellows 40. The bellows 40 enables preferably to apply the compressive force to the stationary seal ring 50 and thereby the mechanical seal device 1 enables preferably to exhibit sealing performance.

Second Embodiment

Figure 5:
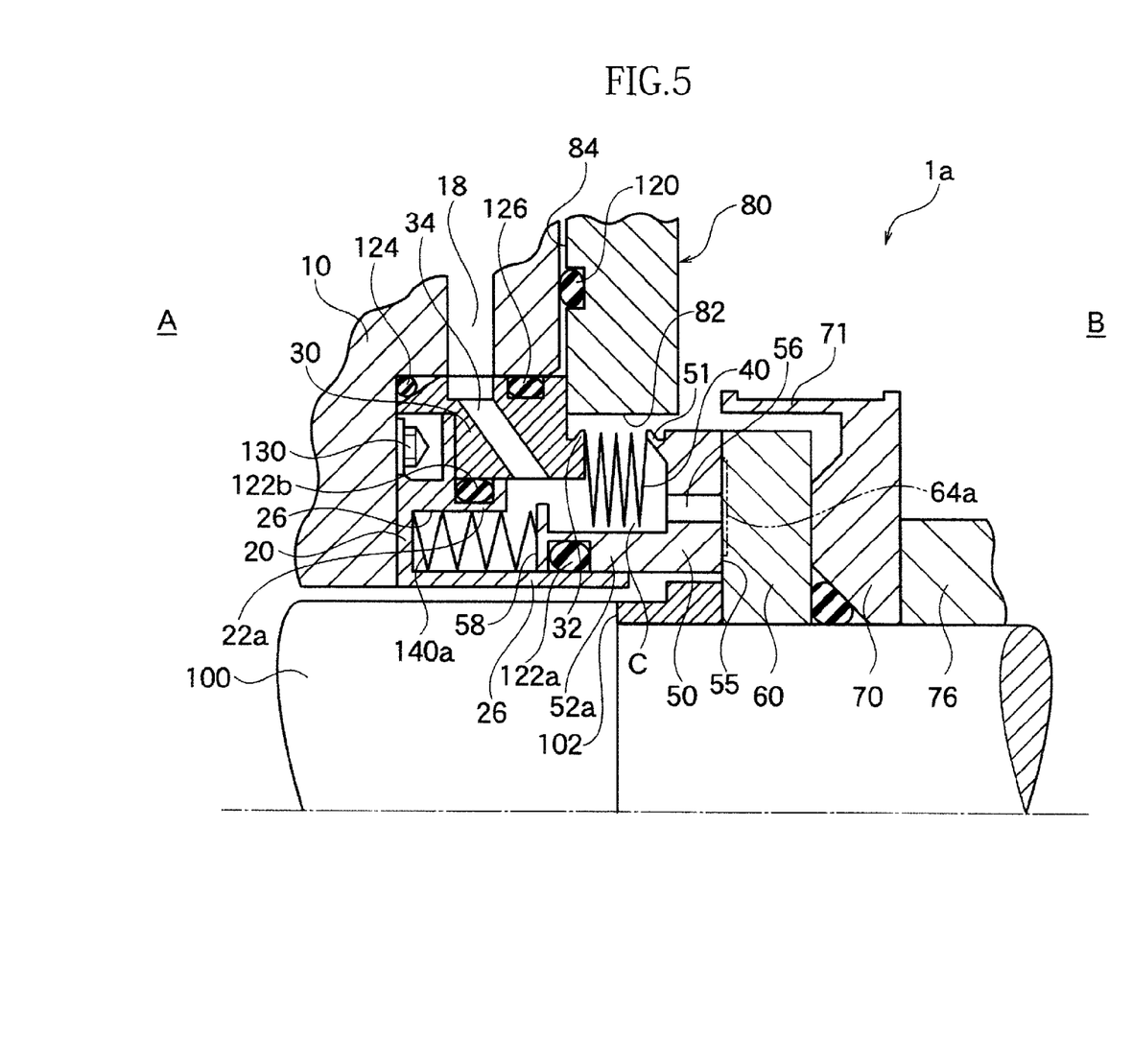
FIG. 5 is a half section of the mechanical seal device according to other embodiments of the present invention.

As illustrated in FIG. 5, a mechanical seal device 1a according to the present embodiment is an alternative of the mechanical seal device 1 of the first embodiment illustrated in FIGS. 1 to 4, and has the same structure and the same function effects with the first embodiment except for the followings. For the structure common to the first embodiment, similar marks are used in the figure and the explanations for the overlapped parts are omitted.

In this embodiment, inside of the static pressure fluid chamber C, a plurality of coil springs 140a serving as resilient members are intermittently arranged in a circumferential direction. In order to achieve the above structure, in this embodiment, a cylindrical protruding portion 26 extending toward the rotary seal ring 60 is integrally formed on a radially inner end of the adapter 20. At an outer circumference of tip end of the cylindrical protruding portion 26, a cylindrical portion 52a of the static seal ring 50 is movably mounted in the axial direction.

At the inner circumference of the cylindrical portion 52a, O-ring grooves are formed and O-rings 122a (seal member) are mounted thereon. Further, the O-rings 122a are elastically deformed between the inner circumferential surface of the cylindrical portion 52a of the static seal ring 50 and the outer circumferential surface of the cylindrical protruding portion 26 of the adapter 20 to seal the static fluid chamber C from the atmosphere side space, corresponding to the machine outside A.

Tips of the plurality of coil springs 140a intermittently arranged in the circumferential direction contact with a back-side rear end 58 of the cylindrical portion 52a (the end opposite to the rotary seal ring 60). The rear ends of each coil spring 140a are respectively placed in the spring seats 26, having cylindrical holes, which are intermittently formed along the circumferential direction and radially outward of the cylindrical protruding portion 26. Each coil spring 140a generates a spring force so as to press the static seal ring 50 toward the rotary seal ring 60. Further, among the spring seats 26 intermittently arranged in the circumferential direction, rotation stop pins preventing the static seal ring 50 from rotating relatively with the adapter 20 may be arranged.

Further, in order to ensure the sealing performance between the adapter 20 and the seal case 30, the O-ring grooves are formed at the outer circumference of an outer circumferential side protruding portion 22a of the adapter 20 and O-rings 122b are mounted thereon. The O-ring 122b is a seal member to seal the inside of the static fluid chamber C from the atmosphere side space, together with the O-ring 122a. However, the O-ring 122b is not necessary when the adapter 20 is integrally formed with the seal case 30.

In the present embodiment, the shape and pattern of the dynamic pressure generating groove 64a formed on the seal surface of the rotary seal ring 60 may be different from or the same with those of the dynamic pressure generating groove 64 of the first embodiment. Further, in the present embodiment, although the annular grooves 57 as illustrated in FIG. 4 is preferably formed on the seal surface 55 of the static seal ring 50, it does not necessarily have to be formed.

In the present embodiment, the coil spring 140a serving as a resilient member is arranged inside of the static fluid chamber C. Therefore, the pressure of the static pressure fluid in the static pressure fluid chamber C acts on the back-side rear end 58 of the stationary seal ring 50. With this, it enables to increase the force pressing the stationary seal ring 50 to the rotary seal ring 60, with the static pressure fluid. The above structure of the present embodiment is especially effective in order to increase the force pressing the stationary seal ring 50 to the rotary seal ring 60.

Further, the above embodiments are described so as to facilitate understanding of the present invention, and the present invention is not limited to them only. Each element disclosed in the present embodiments include all design changes and equivalents belonging to the technical scope of the present invention, and further arbitrary suitable modifications can be made.

INDUSTRIAL APPLICABILITY

The present invention can be used, for example, for pumps for general industrial use and the like. In addition to that, in any apparatuses having a rotary shaft, the present invention can be used as a shaft seal device of the rotary shaft.

DESCRIPTION OF THE REFERENCE NUMERALS

10 - - - seal housing
20 - - - adapter
30 - - - seal case
40 - - - bellows
50 - - - stationary seal ring
56 - - - communication hole
60 - - - rotary seal ring
64, 64a - - - dynamic pressure generating groove
80 - - - staffing box
100 - - - rotary shaft
122, 122a, 122b - - - O-ring
A - - - machine outside
B - - - machine inside
C - - - static pressure fluid chamber
dob - - - inner diameter of annular groove
do - - - contact diameter of O-ring
dbb - - - outer diameter of annular groove
db - - - pressure acting diameter of bellows

The invention claimed is:

1. A mechanical seal device for sealing a sealed fluid inside of a machine at a space formed between a device main body and a rotary shaft, comprising:
   a seal case attached to the device main body,
   a rotary seal ring attached to the rotary shaft,
   a stationary seal ring arranged in an axial direction opposing to the rotary seal ring,
   a bellows attached extendably in the axial direction between the stationary seal ring and the seal case, the bellows applying compressive force pressing the stationary seal ring toward the rotary seal ring,
   a resilient member pressing the stationary seal ring toward the rotary seal ring,
   a static pressure fluid supplying hole, formed on the seal case, supplying a static pressure fluid to a static pressure fluid chamber arranged at an inner circumferential side of the bellows, and
   a seal member, arranged between the seal case and the stationary seal ring at the inner circumferential side of the bellows, holding the stationary seal ring movably in the axial direction and sealing the static pressure fluid chamber from an atmosphere side space, wherein
   communication holes are formed on the stationary steel ring extending from the static pressure fluid chamber, and guiding the static pressure fluid of the static pressure fluid chamber between a sealing surface of the stationary seal ring and a sealing surface of the rotary seal ring,
   an annular groove connecting each communication hole is formed on the stationary seal ring,
   an outer diameter of the annular groove is designed so that it is essentially equal to a pressure acting diameter of the bellows, an inner diameter of the annular groove is designed so that it is essentially equal to a contact diameter where the seal member contacts the stationary seal ring, and the sealed fluid is arranged at an outer circumferential side of the bellows.

2. The mechanical seal device as set forth in claim 1, wherein the resilient member is arranged closer to the atmosphere side than the seal member.

3. The mechanical seal device as set forth in claim 1, wherein the resilient member is arranged inside the static pressure fluid chamber.

4. The mechanical seal device as set forth in claim 1, wherein dynamic pressure generating grooves are formed on the sealing surface of the rotary seal ring which opposes the sealing surface of the stationary seal ring on which the annular groove is formed.

5. The mechanical seal device as set forth in claim 1, further comprising:
    a flinger arranged in the axial direction at the machine inside of the rotary seal ring, wherein
    a cylindrical portion, extending in the axial direction, is formed at an outer circumference of the flinger, the cylindrical portion covering a protruding portion protruding from the device main body in the axial direction.

6. The mechanical seal device as set forth in claim 1, wherein the static pressure fluid is a purge gas or a liquid.

7. A mechanical seal device for sealing a sealed fluid inside of a machine at a space formed between a device main body and a rotary shaft, comprising:
    a seal case attached to the device main body,
    a rotary seal ring attached to the rotary shaft,
    a stationary seal ring arranged in an axial direction opposing to the rotary seal ring,
    a bellows attached extendably in the axial direction between the stationary seal ring and the seal case, the bellows applying compressive force pressing the stationary seal ring toward the rotary seal ring,
    a resilient member pressing the stationary seal ring toward the rotary seal ring,
    a static pressure fluid supplying hole, formed on the seal case, supplying a static pressure fluid to a static pressure fluid chamber arranged at an inner circumferential side of the bellows, and
    a seal member, arranged between the seal case and the stationary seal ring at the inner circumferential side of the bellows, holding the stationary seal ring movably in the axial direction and sealing the static pressure fluid chamber from an atmosphere side space, wherein
    communication holes are formed on the stationary steel ring extending from the static pressure fluid chamber, and guiding the static pressure fluid of the static pressure fluid chamber between a sealing surface of the stationary seal ring and a sealing surface of the rotary seal ring,
    an annular groove connecting each communication hole is formed on the stationary seal ring,
    dynamic pressure generating grooves are formed on the sealing surface of the rotary seal ring opposing to a sealing surface of the stationary seal ring on which the annular groove is formed,
    an outer diameter of the annular groove is designed so that it is essentially equal to a pressure acting diameter of the bellows,
    an inner diameter of the annular groove is designed so that it is essentially equal to a contact diameter where the seal member contacts the stationary seal ring, and
    the sealed fluid is arranged at an outer circumferential side of the bellows.

8. The mechanical seal device as set forth in claim 7, wherein the resilient member is arranged closer to the atmosphere side than the seal member.

9. The mechanical seal device as set forth in claim 7, wherein the resilient member is arranged inside the static pressure fluid chamber.

10. The mechanical seal device as set forth in claim 7, further comprising:
    a flinger arranged in the axial direction at the machine inside of the rotary seal ring, wherein
    a cylindrical portion, extending in the axial direction, is formed at an outer circumference of the flinger, the cylindrical portion covering a protruding portion protruding from the device main body in the axial direction.

11. The mechanical seal device as set forth in claim 7, wherein the static pressure fluid is a purge gas or a liquid.

* * * * *